US00RE40170E

(19) United States
(12) Reissued Patent
Goto et al.

(10) Patent Number: US RE40,170 E
(45) Date of Reissued Patent: Mar. 25, 2008

(54) MULTI-TONE IMAGE PROCESSING METHOD AND APPARATUS

(75) Inventors: Hiroshi Goto, Tokyo (JP); Satoshi Deishi, Hino (JP)

(73) Assignee: Minolta Co., Ltd., Osaka-Shi, Osaka (JP)

(21) Appl. No.: 09/288,966

(22) Filed: Apr. 9, 1999

Related U.S. Patent Documents

Reissue of:
(64) Patent No.: 5,790,272
Issued: Aug. 4, 1998
Appl. No.: 08/323,924
Filed: Oct. 17, 1994

(30) Foreign Application Priority Data

Oct. 18, 1993 (JP) ..... 5-259691

(51) Int. Cl.
*H04N 1/405* (2006.01)
*H04N 1/407* (2006.01)
*H04N 1/29* (2006.01)
*B41J 2/47* (2006.01)

(52) U.S. Cl. ..... 358/3.24; 358/3.2; 358/3.12; 358/3.13; 358/3.23; 347/131; 347/251

(58) Field of Classification Search ..... 358/3.13, 358/3.16, 3.12, 3.06, 3.23, 1.9, 3.02, 3.09, 358/3.11; 347/131, 251–254
See application file for complete search history.

(56) References Cited

U.S. PATENT DOCUMENTS 4,342,051 A * 7/1982 Suzuki et al. ..... 358/3.13
4,517,606 A * 5/1985 Yokomizo et al. ..... 358/3.13
4,698,778 A * 10/1987 Ito et al. ..... 358/3.07
4,967,211 A * 10/1990 Colby et al. ..... 347/131
5,041,920 A * 8/1991 Hayes et al. ..... 358/3.21
5,099,259 A * 3/1992 Hirahara et al. ..... 347/183
5,258,780 A * 11/1993 Ema et al. ..... 347/252
5,270,827 A * 12/1993 Kobayashi et al. ..... 358/3.02

FOREIGN PATENT DOCUMENTS

| | | |
|---|---|---|
| JP | 4-6947 | 1/1982 |
| JP | 60-68775 | 4/1985 |
| JP | 61-23466 | 1/1986 |
| JP | 2-63859 | 3/1990 |
| JP | 2-63860 | 3/1990 |
| JP | 63-4773 | 1/1998 |

* cited by examiner

*Primary Examiner*—Scott Rogers
(74) *Attorney, Agent, or Firm*—Buchanan Ingersoll & Rooney PC

(57) ABSTRACT

A multi-tone image processing method and apparatus in which mutually dissimilar tone levels are realized by changing the additive condition of recording energy by means of different recording positions, even when the number of recording operations within a specific range is identical. For example, in an electrophotographic apparatus, when the number of irradiation by a light spot within a specific range remains constant as the irradiation position is changed in the specific range, there is a change in the additive condition of the optical energy within said specific range. Thus, the area rendered visible within the aforesaid specific range also changes, thereby changing the tone level.

18 Claims, 22 Drawing Sheets

MULTI-TONE IMAGE PROCESSING METHOD AND APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a multi-tone image processing method and apparatus for use in, for example, electrophotographic digital copying apparatus and printers.

2. Description of the Related Art

Various recording methods have been proposed for conventional digital copying apparatus and printers, such as a density pattern method, a dither pattern method and the like for recording multi-tone images.

The density pattern method binarizes original image data of a single picture element by review of a plurality of threshold values associated with a plurality of recording dots, so as to reproduce a plurality of tone levels by a plurality of mutually dissimilar dot patterns. The dither pattern method binarizes original image data of a single picture element by review of one of a plurality of threshold values associated with a plurality of recording dots, so as to reproduce a single picture element of the original image by a single recording dot. A density-dither pattern method combining both the density pattern method and the dither pattern method are also known.

The matrices of threshold values used in the aforesaid methods can be classified as Fattening types wherein dots are concentrated in the center of the matrix in halftone levels, and Bayer types wherein dots are dispersed throughout the entire matrix in halftone levels. When a Bayer type threshold value matrix is used, there is a tendency to have a high degree of gamma recording characteristics. On the other hand, when a Fattening type threshold value matrix is used, resolution is reduced when the matrix size is increased to increase the number of tone levels, and the number of tone levels is diminished when the matrix size is reduced to improve resolution.

An improved halftone method (hereinafter referred to as "IH method") has been provided as a recording method that reconciles both tonality and resolution, wherein a transformed Fattening type threshold value matrix is used, and the sizes of the dots are altered by pulse width modulation, as shown in FIG. 1 (refer to Electrophotography, The Society of Electrophotography of Japan, Vol. 25, No. 1, 1986; pp. 31-44). When the aforesaid IH method is used, however, the output characteristics unavoidably include a high degree of gamma characteristics. Thus, only the necessary patterns must be extracted to equalize the steps of density variation so as to obtain linear output. In such an instance, the actual number of reproducible tone levels is less than the theoretical value.

In the previously described methods, it is difficult to achieve adequate compatibility between tonality and resolution. This difficulty is due to the precondition that the frequency of recordings within the matrix range, i.e., the total recording time, must be invariably increased to improve the output density.

SUMMARY OF THE INVENTION

Accordingly, a main object of the present invention is to provide a multi-tone image processing method and apparatus capable of reconciling tonality and resolution.

Another object of the present invention is to provide a multi-tone image processing method and apparatus ideal for electrophotographic apparatus.

From one perspective of the present invention, mutually dissimilar tone levels can be realized by changing the additive condition of recording energy by means of different recording positions, even when the number of recording operations within a specific range is identical.

For example, when an electrophotographic apparatus irradiates the surface of a photosensitive member via a light spot, and thereafter develops the area irradiated by said light spot via a developer, those areas which have received light energy above a predetermined value are rendered visible. When the number of irradiation by a light spot (i.e., total irradiation time) within a specific range remains constant as the irradiation position is changed in the specific range, there is a change in the additive condition of the optical energy within said specific range. Thus, the area rendered visible within the aforesaid specific range also changes, thereby changing the tone level. Using this principle, two or more tone levels can be realized while the number of irradiation by a light spot remains constant within a specific range.

BRIEF DESCRIPTION OF THE DRAWINGS

These and other objects and features of the present invention will become apparent from the following description of a preferred embodiment thereof taken in conjunction with the accompanying drawings, in which.

In the following description, like parts are designated by like reference number throughout the several drawings.

DESCRIPTION OF THE PREFERRED EMBODIMENT

Figure 1:
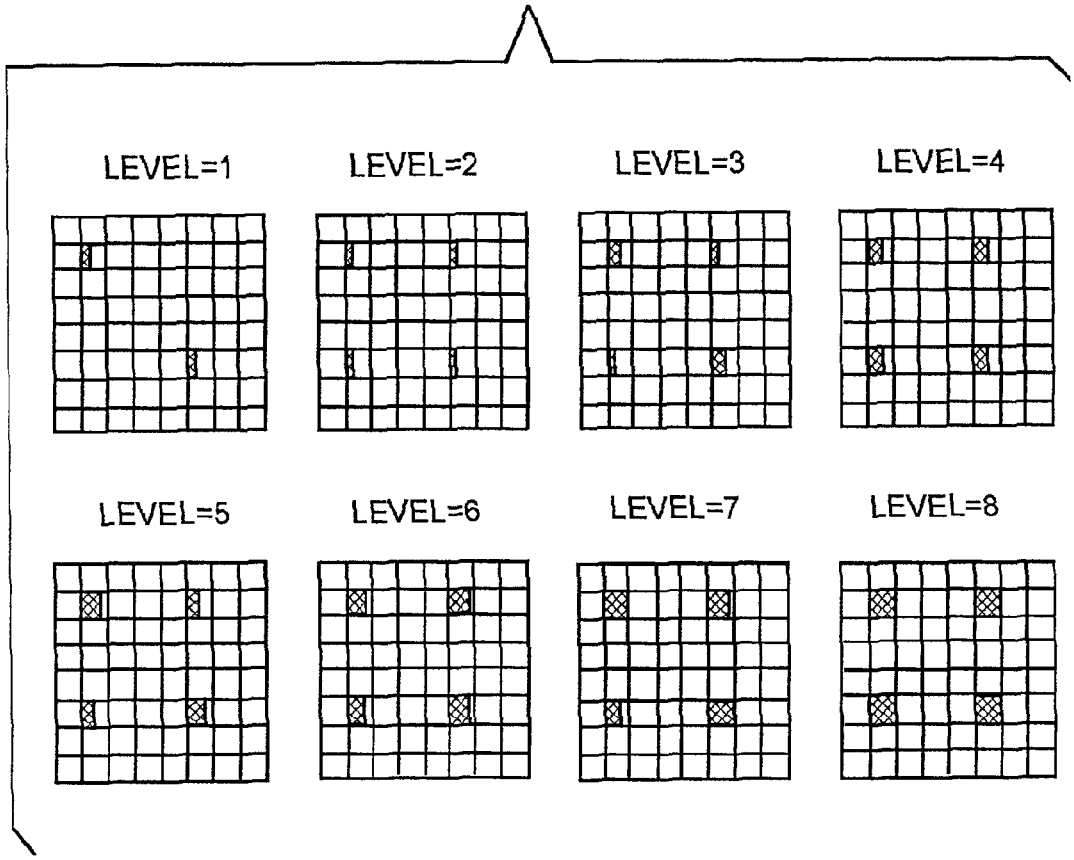
Fig. 1 (Prior Art)
FIG. 1 is an illustration showing multi-tone recordings of a conventional improved halftone method.
Figure 2:
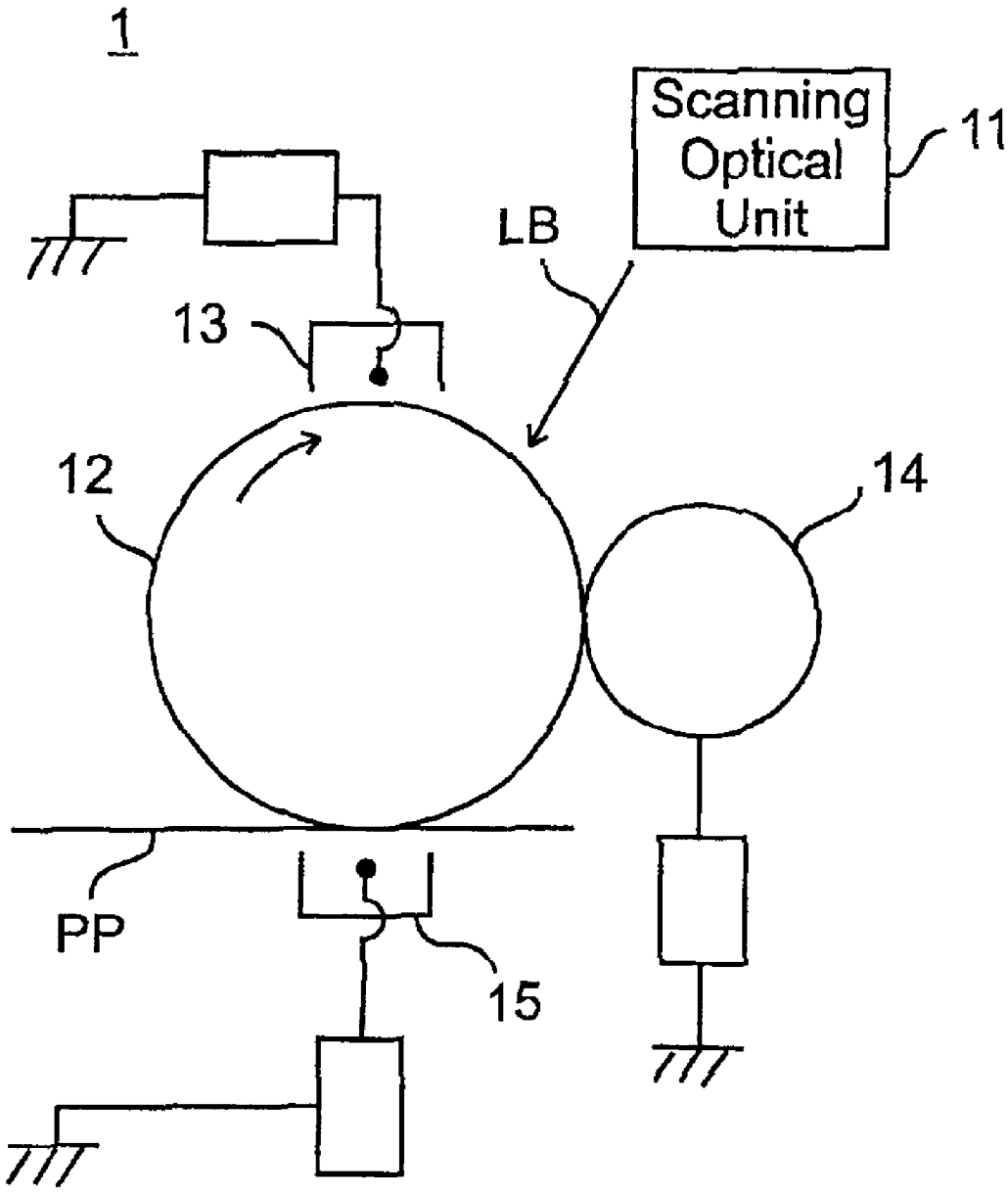
FIG. 2 briefly shows the construction of an embodiment of a printer.

FIG. 2 briefly shows the construction of an embodiment of printer 1. Printer 1 comprises scanning optical unit 11, photosensitive drum 12, charger 13, developing device 14, and transfer charger 15. Photosensitive drum 12 is rotatable at constant speed in the arrow direction in the drawing; the surface of photosensitive drum 12 is uniformly charged to a predetermined potential by charger 13. Laser beam LB emitted from scanning optical unit 11 irradiates the surface of photosensitive drum 12 so as to form an electrostatic latent image thereon. The electrostatic latent image is developed by developing device 14, thereby being rendered visible as a toner image. The toner image is transferred onto recording paper PP via transfer charger 15, and fused onto the recording paper PP via a fixing device not shown in the illustration.

Figure 3:
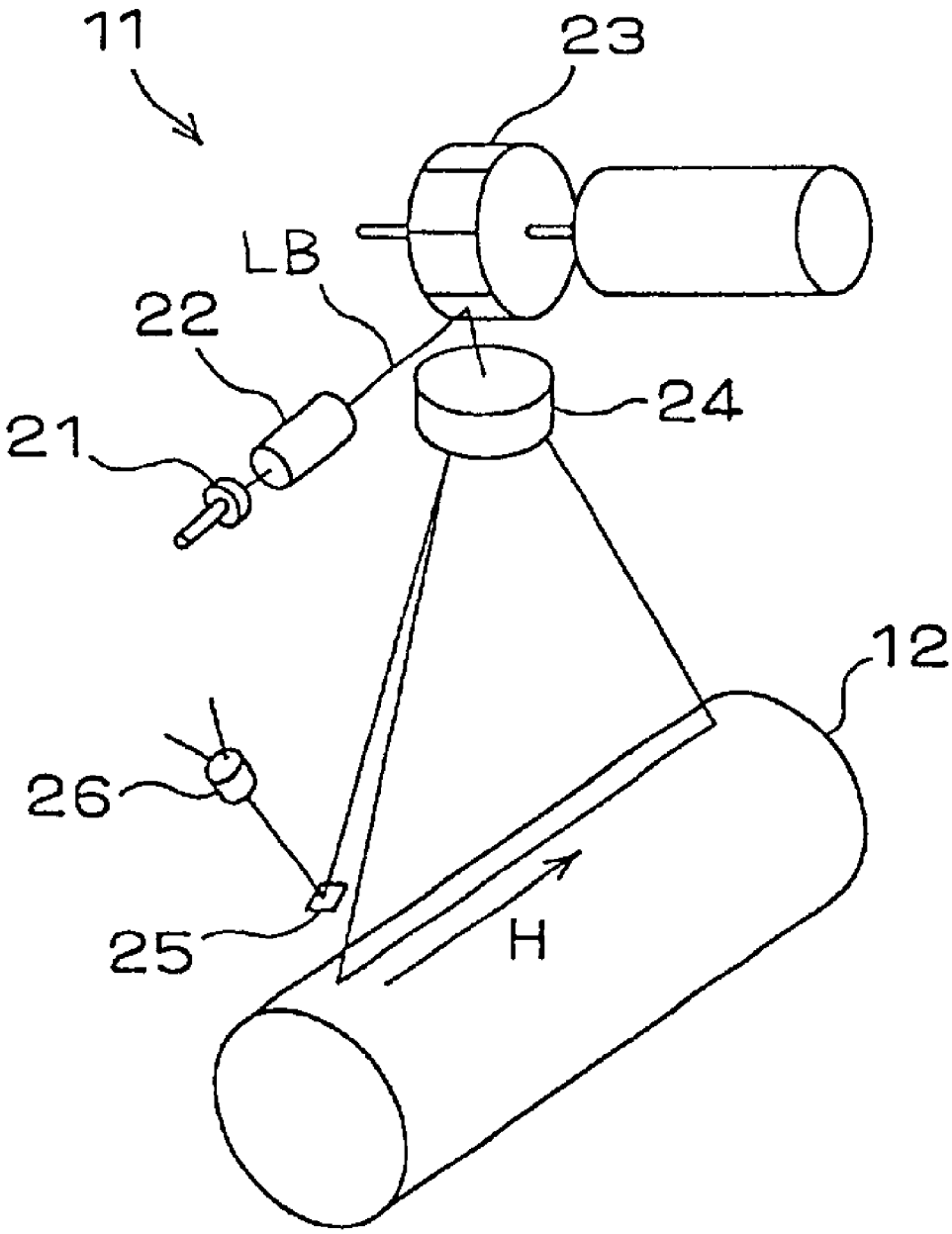
FIG. 3 is a perspective view briefly showing the construction of the scanning optical system of the printer in FIG. 2.

FIG. 3 briefly shows the construction of scanning optical unit 11. Semiconductor laser 21 emits laser beam LB in accordance with image information read from the memory of a control section not shown in the drawing. Laser beam LB is collimated by collimator lens 22, and deflected by polygonal mirror 23. Deflected laser beam LB passes through fθ lens 24 and impinges the surface of photosensitive drum 12. The beam scanning of the surface of photosensitive drum 12 is realized via the rotation of polygonal mirror 23. In the aforesaid beam scanning, the light at the starting edge of the laser beam scan line is reflected by mirror 25, and arrives at sensor 26. An output signal from sensor 26 is used as a synchronization signal for beam scanning in the main scan (horizontal or row) direction H. Scanning in the sub-scanning direction (vertical or column), which is perpendicular to the main scan direction, is realized via the rotation of photosensitive drum 12.

Figure 4:
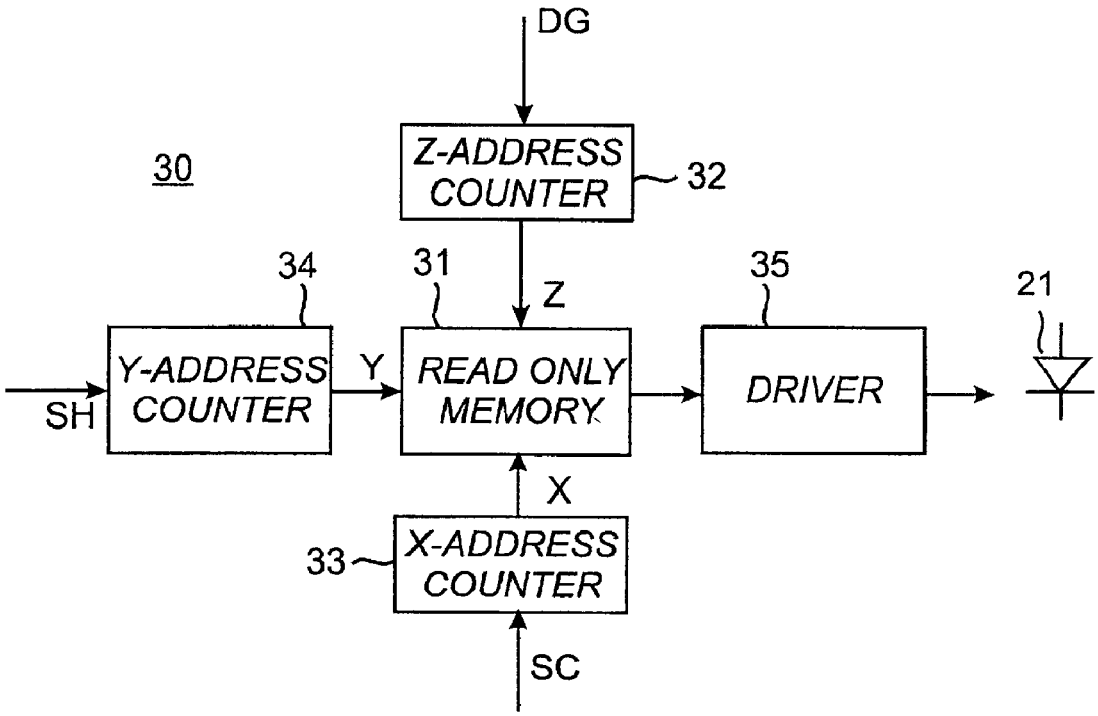
FIG. 4 is a block diagram showing the semiconductor laser drive circuit of the scanning optical system in FIG. 3.

Drive circuit 30 of semiconductor laser 21 comprises pattern read only memory (ROM) 31, Z-address counter 32, X-address counter 33, Y-address counter 34, and driver 35, as shown in FIG. 4.

Pattern ROM 31 stores a plurality of exposure patterns of m*n matrices. With respect to the exposure pattern specified by Z-address counter 32, the value of each cell is sequentially specified by X-address counter 33 and Y-address counter 34, and is output as 1-bit data DE.

Z-address counter 32 generates and outputs Z-address Z for image data DG of every single picture elements based on the image data DG read out from an image memory not shown in the drawings. Image data DG is, for example, a digital signal expressing a single picture element as 6-bit or 8-bit density information.

Figure 5:
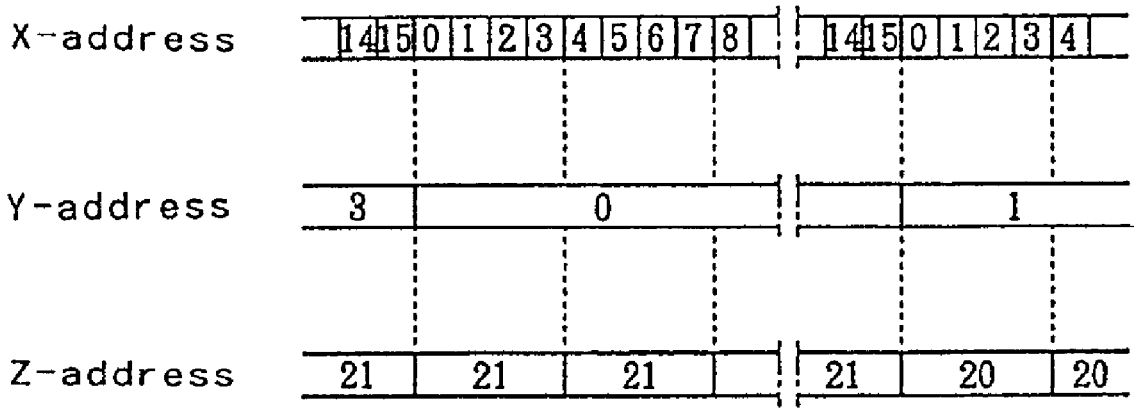
FIG. 5 is an illustration showing the address designation timing in the circuit of FIG. 4.

X-address counter 33 counts the picture element clock signals SC, and outputs said counter value as X-address X. The picture element clock signal SC is a clock signal having a frequency k-fold (where k is a dividing number) greater than the image clock signal. While a single picture element of image data DG is being input, k discrete picture element clock signals SC are generated. X-address counter 33 repeatedly counts within a predetermined range corresponding to cells arrayed in the horizontal direction (main scan direction) of the exposure pattern. For example, if the exposure pattern size is 4 (vertical) by 16 (horizontal), the count is repeated in the range 0-15, as shown in FIG. 5.

Y-address counter 34 counts the horizontal synchronization signal SH, and outputs the count value as Y-address Y. Y-address counter 34 repeatedly counts in a predetermined range corresponding to cells arrayed in the vertical direction (sub-scanning direction) of the exposure pattern. For example, if the size of exposure pattern PS is 4 (vertical) by 16 (horizontal), the counts is repeated in the range 0-3, as shown in FIG. 5.

Driver 35 controls the ON/OFF switching of semiconductor laser 21 based on data DE read out from pattern ROM 31.

Exposure pattern comprises an m*(m*k) matrix wherein each element DT of a square matrix comprising m discrete elements DT in both horizontal and vertical directions are divided into k segments in the horizontal direction, said matrix specifying the respective segments as cells EM. Each cell EM is given a value of either "0" or "1". When a cell EM value is "0", semiconductor laser 21 is OFF. When a cell EM value is "1", semiconductor laser 21 is ON. Accordingly, the area on the surface of photosensitive drum 12 corresponding to the ON state of semiconductor laser 21 is subjected to light exposure, thereby reducing the potential of said exposed area, such that toner adheres to the surface of the drum at such exposed areas, with the result that those areas are rendered black on the surface of recording paper PP. Conversely, the areas of the recording paper PP corresponding to the OFF state of semiconductor laser 21 are rendered white. Hereinafter, the cells EM having a value of "0" are designated EMW, and cells having a value of "1" are designated EMB.

The area of an image recorded in black on recording paper PP via a single EMB is not necessarily constant. That is, the area recorded in black on recording paper PP differs depending on whether or not the cell adjacent to a particular EMB is an EMW cell or an EMB cell, and further differs depending on whether or not said adjacent position is to the left or right or top or bottom.

This phenomenon is fully described hereinafter with reference to FIGS. 6-9.

Figure 6:
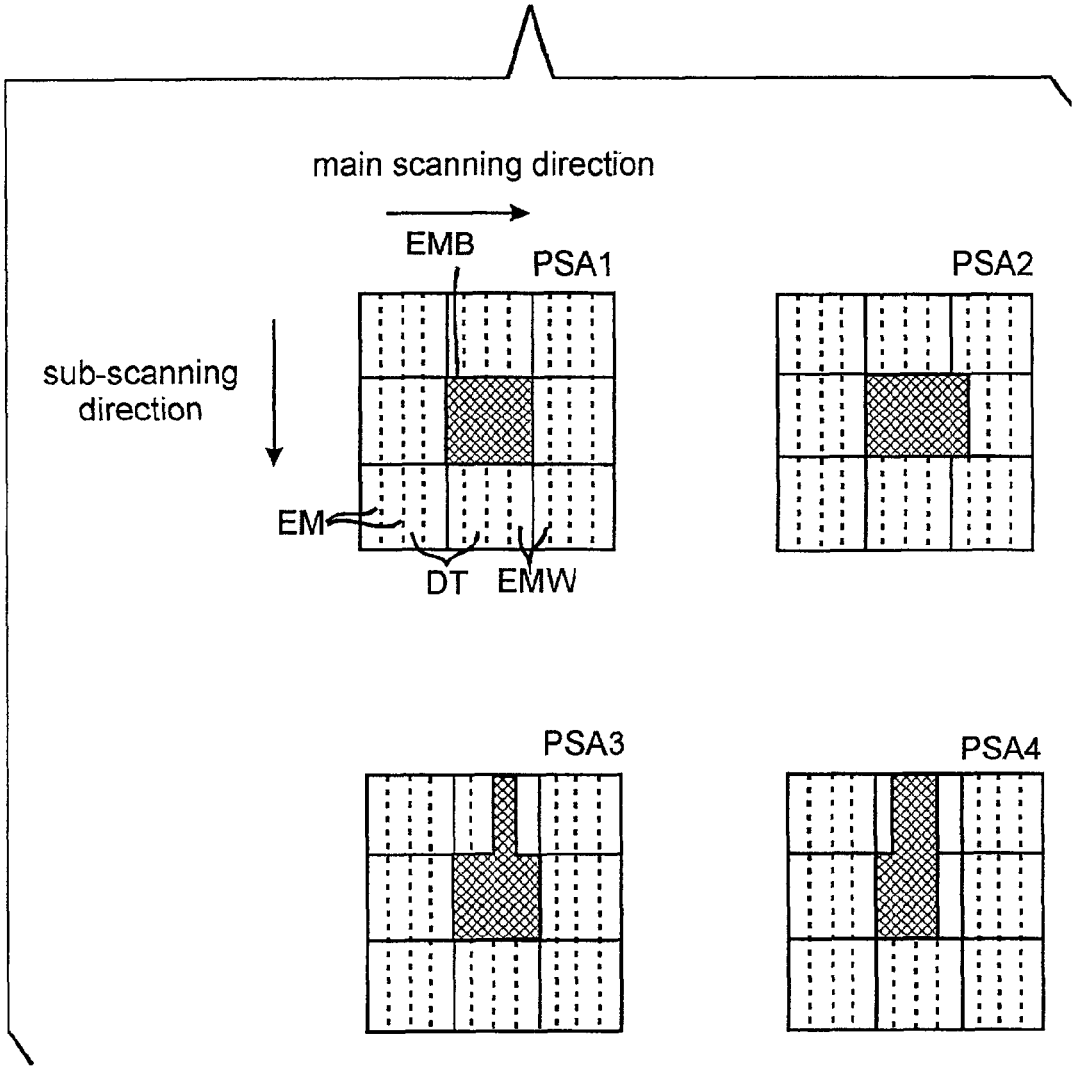
FIG. 6 shows the exposure patterns PSA1-PSA4.
Figure 7:
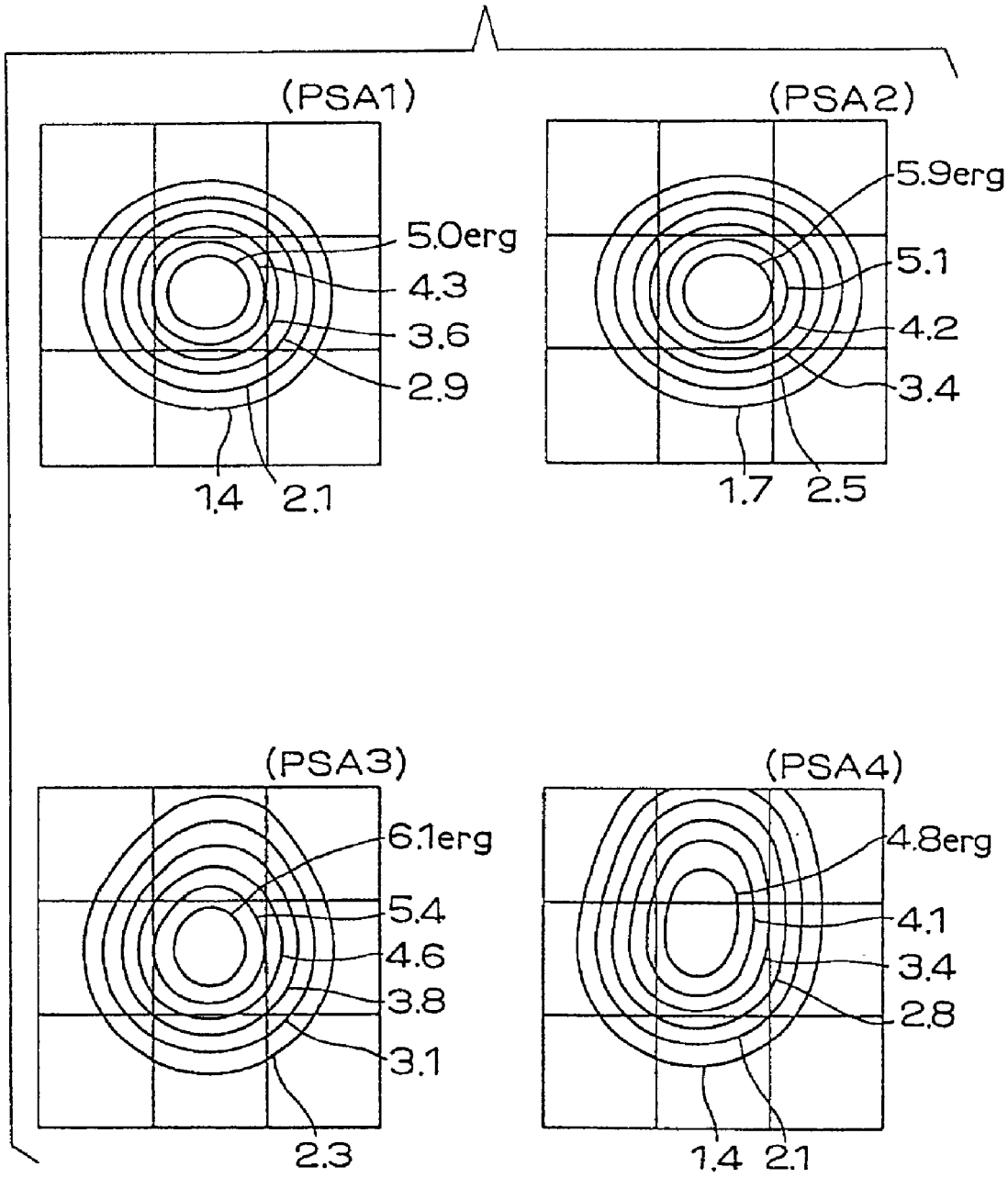
FIG. 7 shows irradiation energy distributions corresponding to the exposure patterns of FIG. 6.
Figure 8:
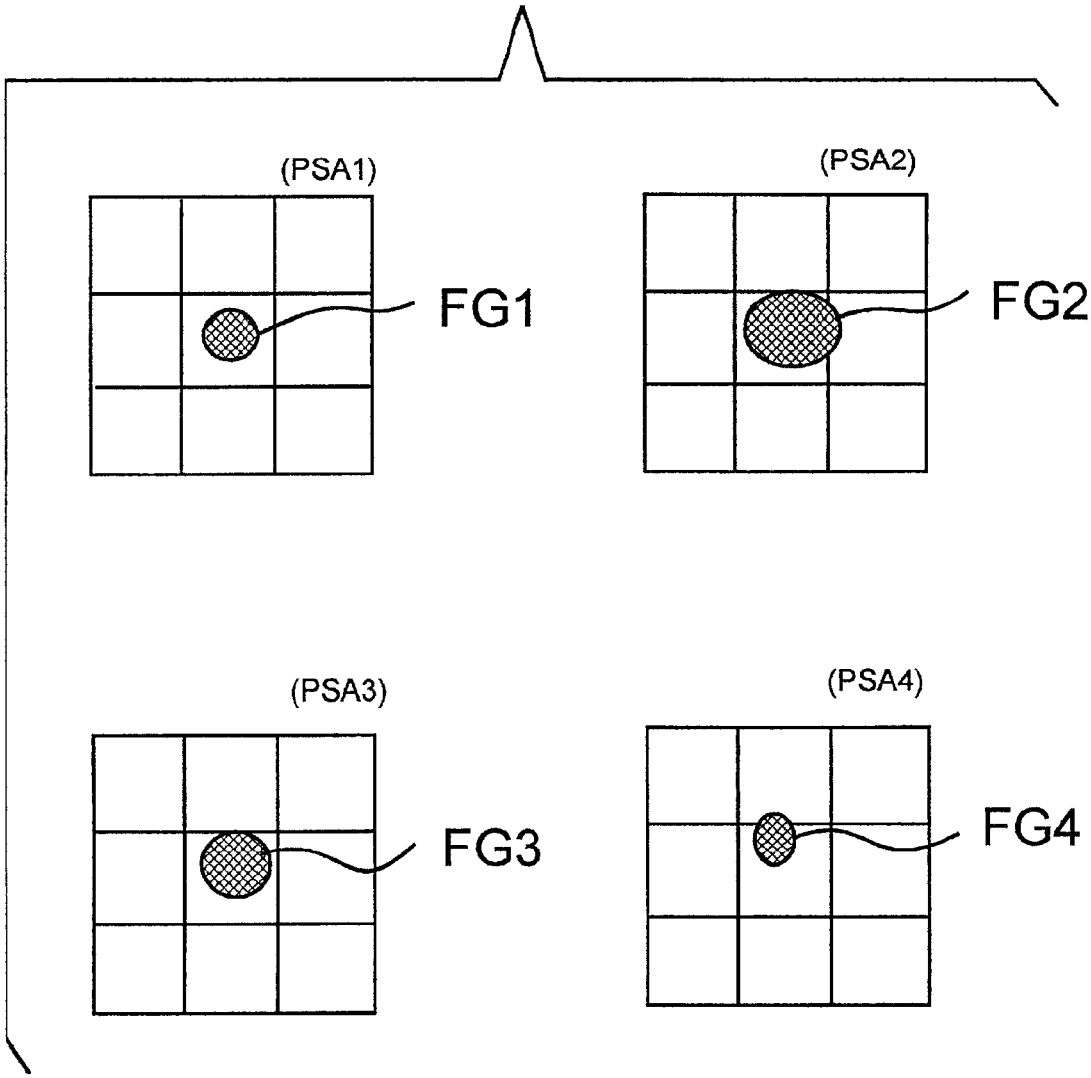
FIG. 8 shows the recording states on the recording paper corresponding to the exposure patterns of FIG. 6.
Figure 9:
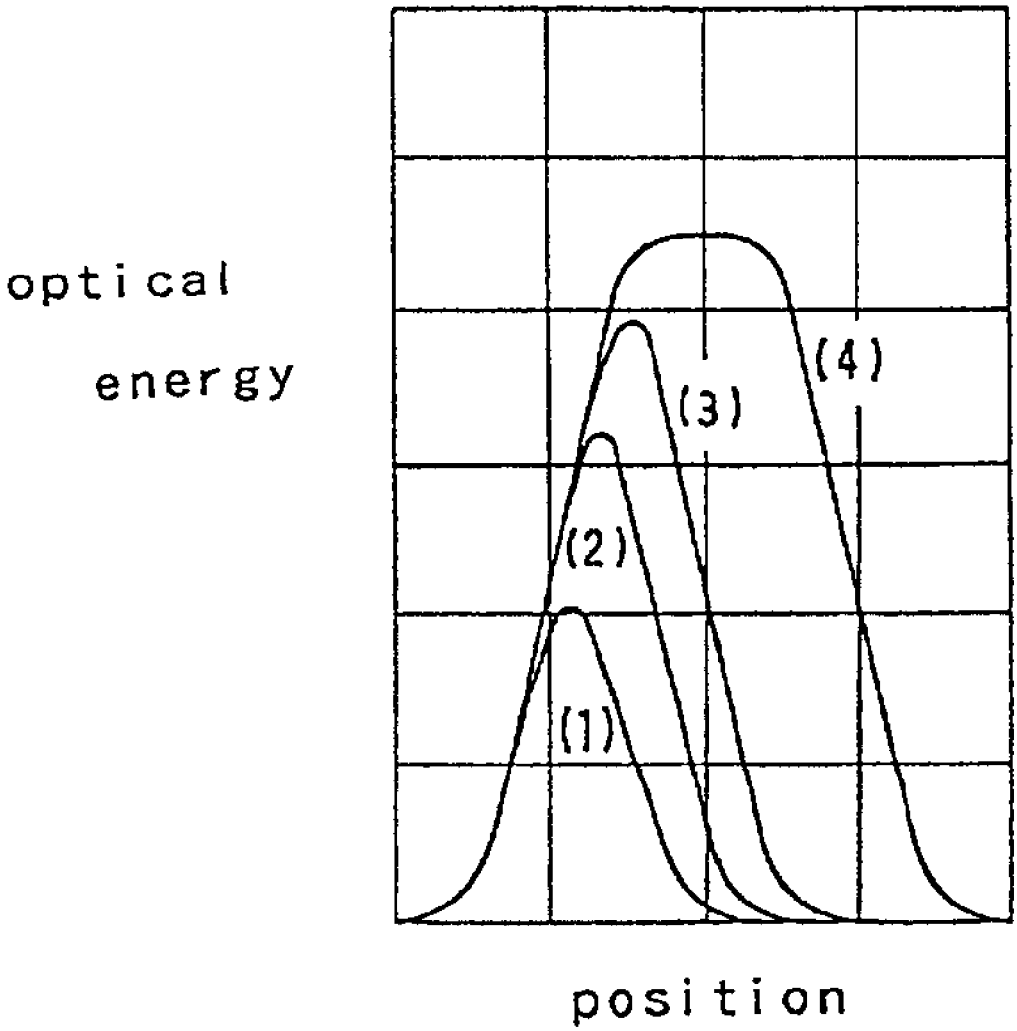
FIG. 9 shows the optical energy distributions via the movement of the optical beam.
Figure 10A:
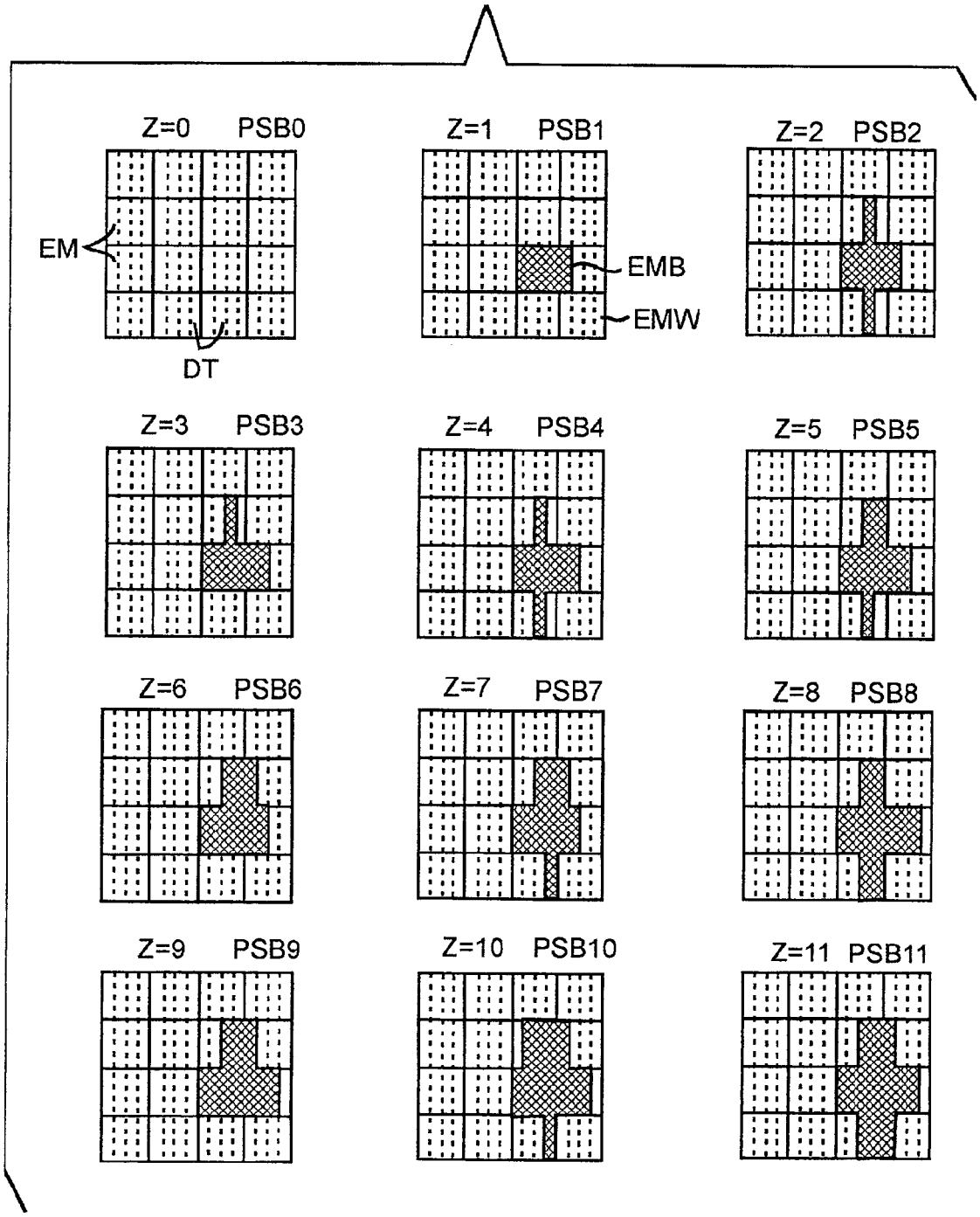
FIGS. 10A-10K show exposure patterns PSB0-PSB128.
Figure 10B:
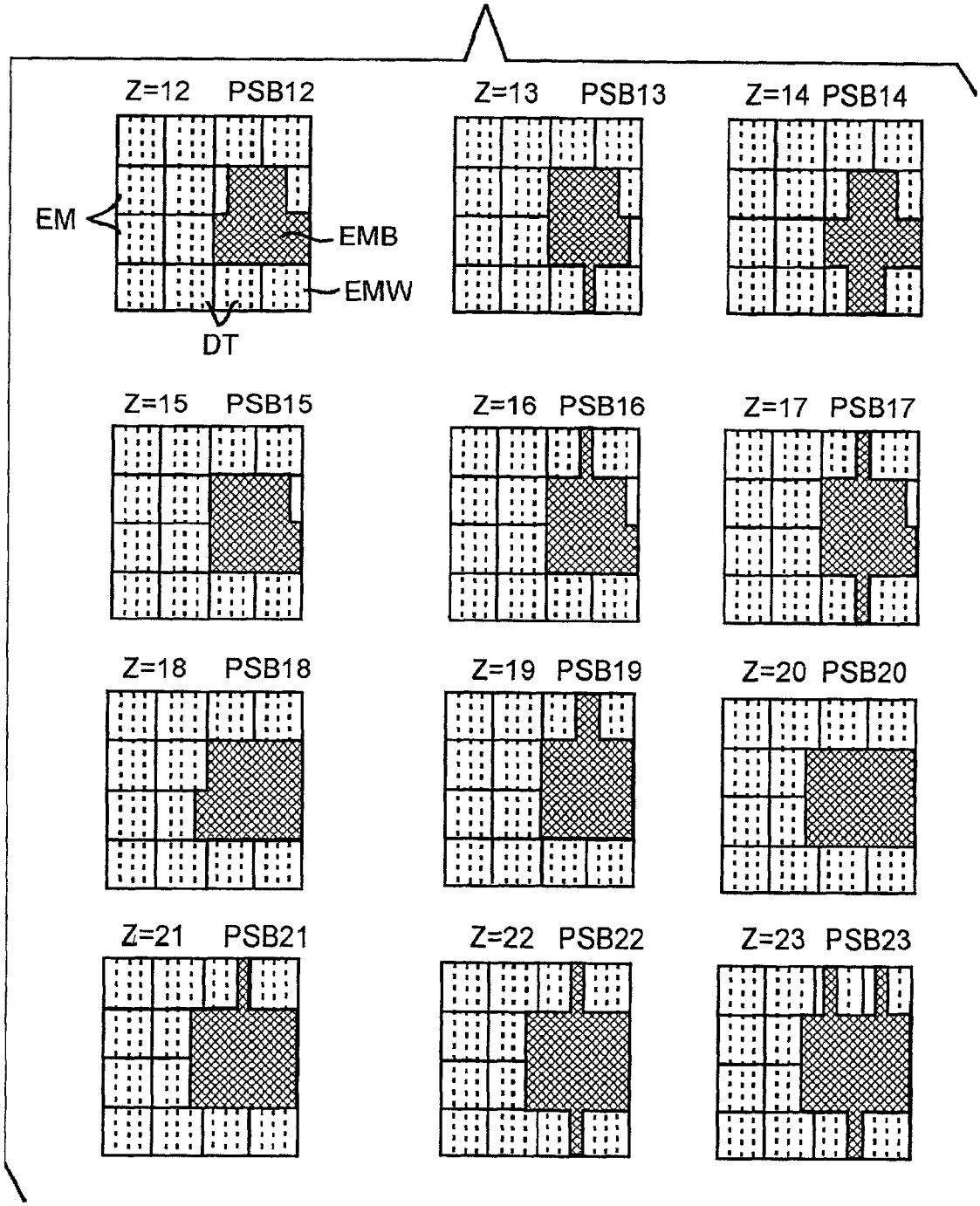
Figure 10C:
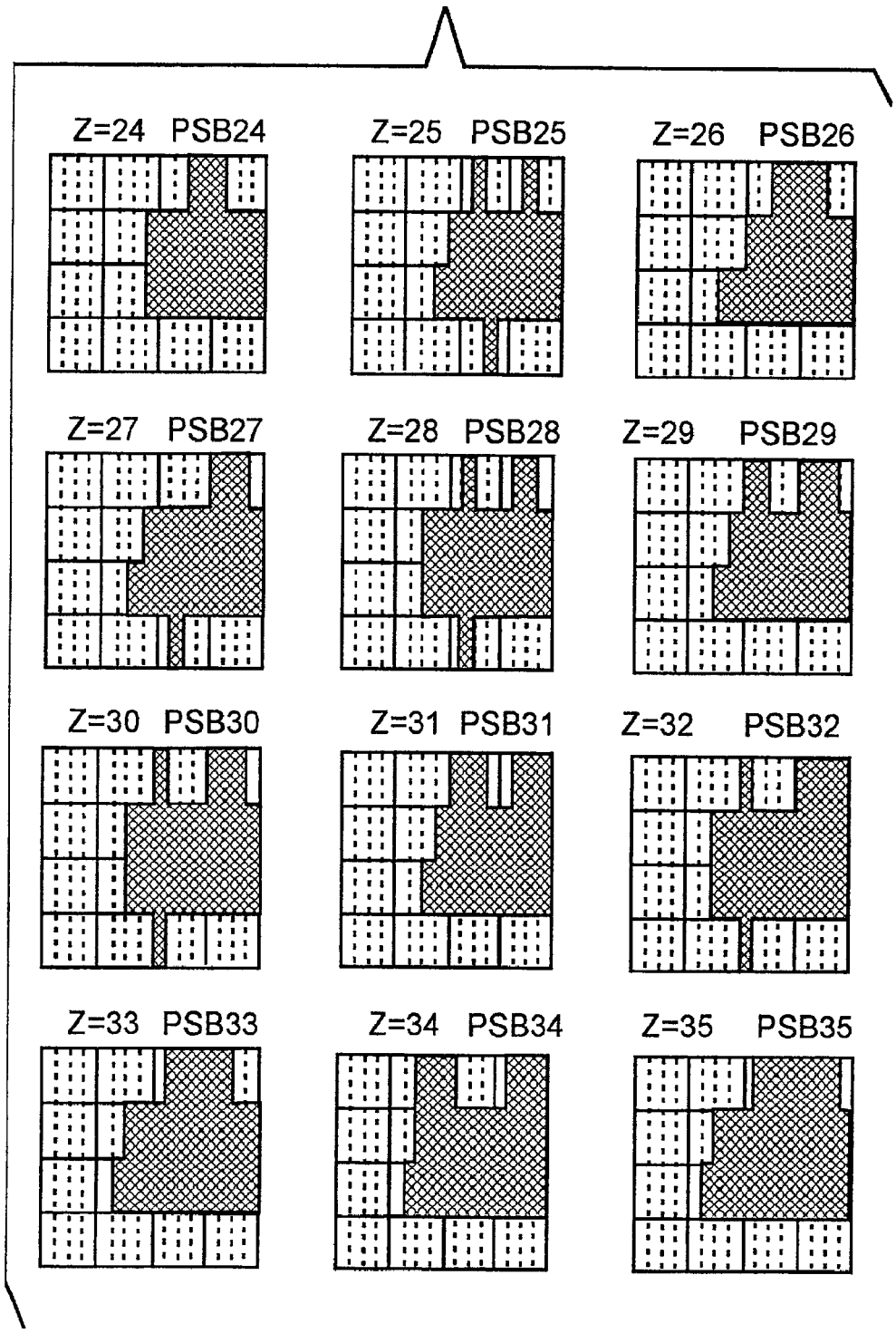
Figure 10D:
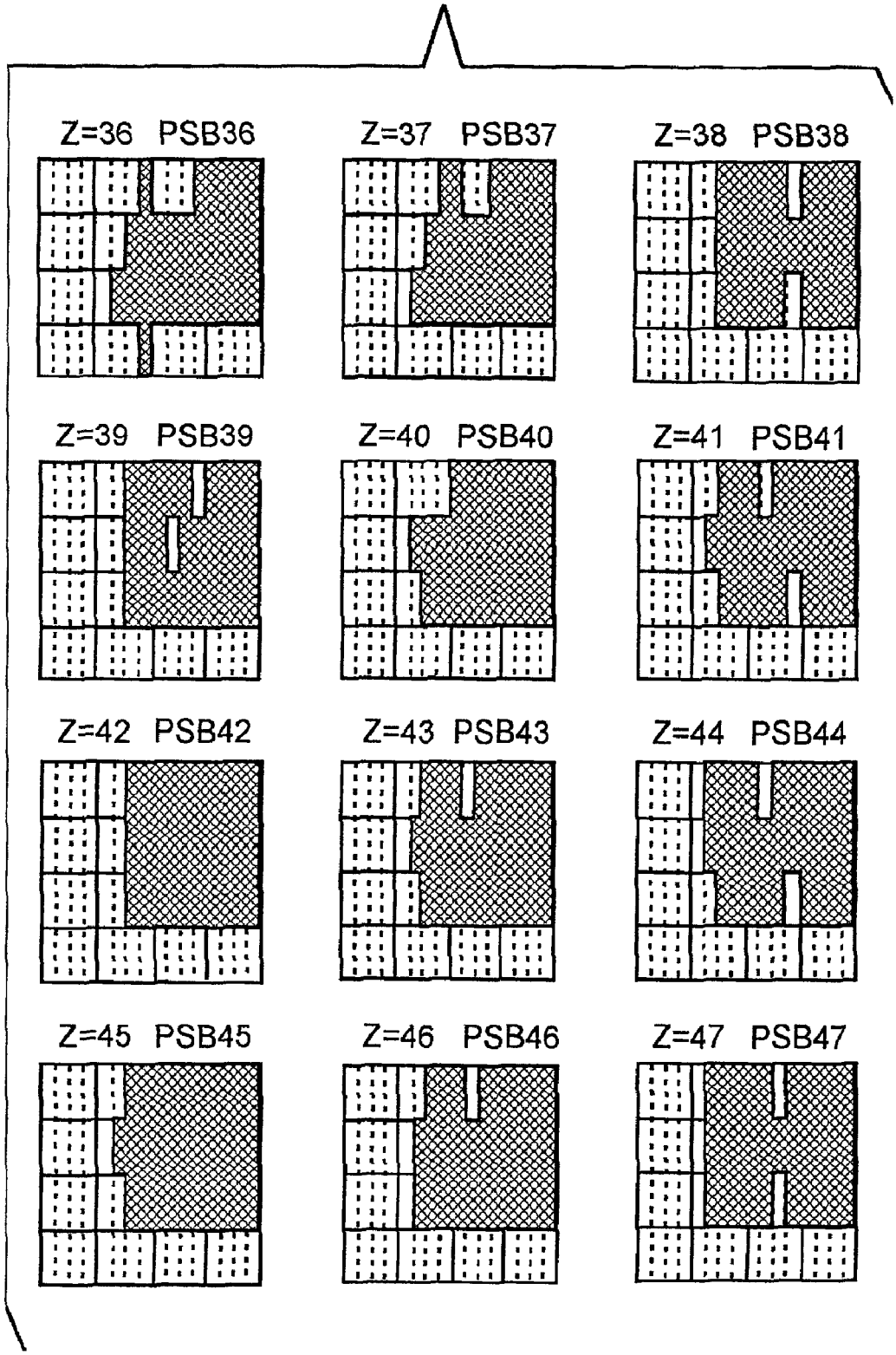
Figure 10E:
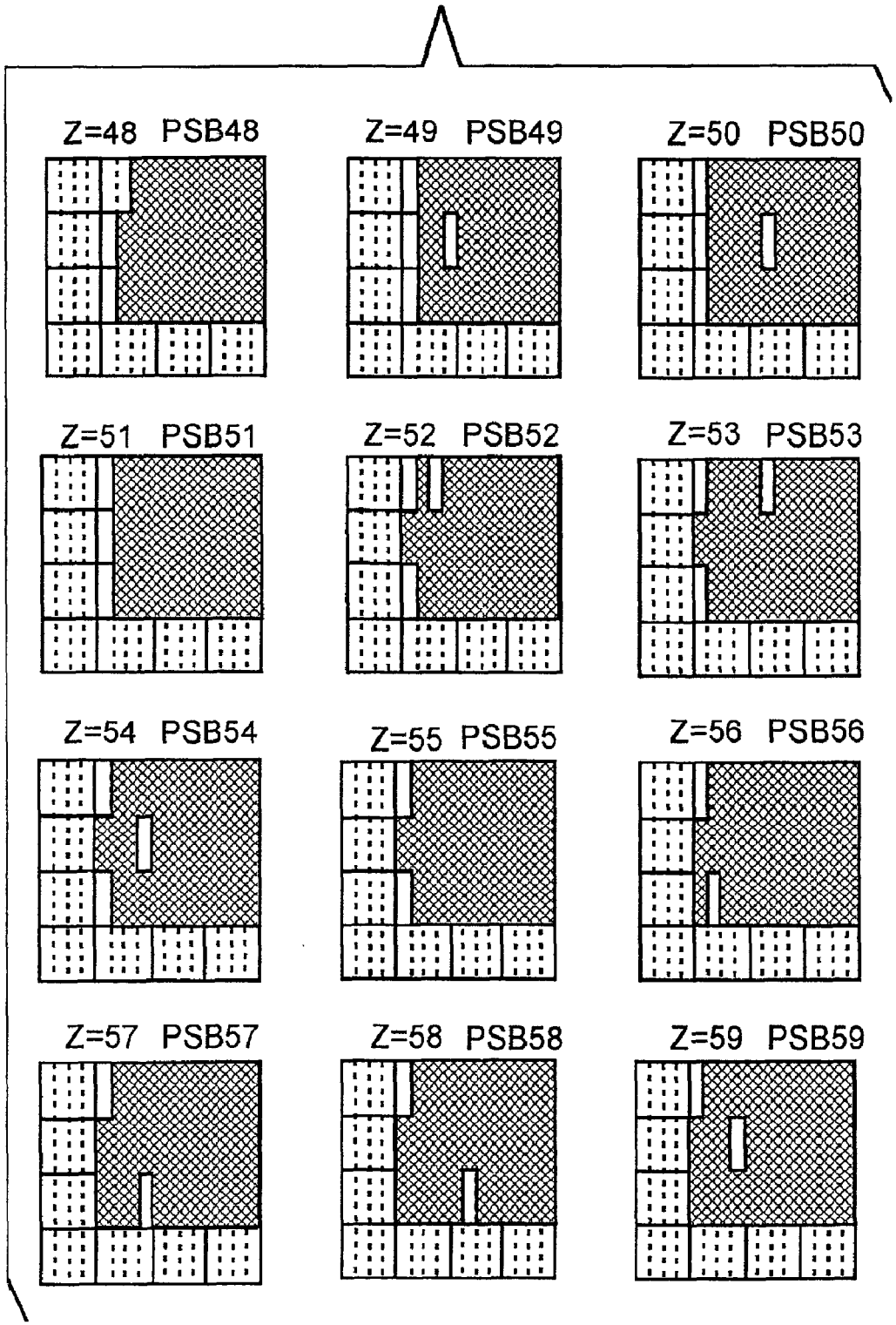
Figure 10F:
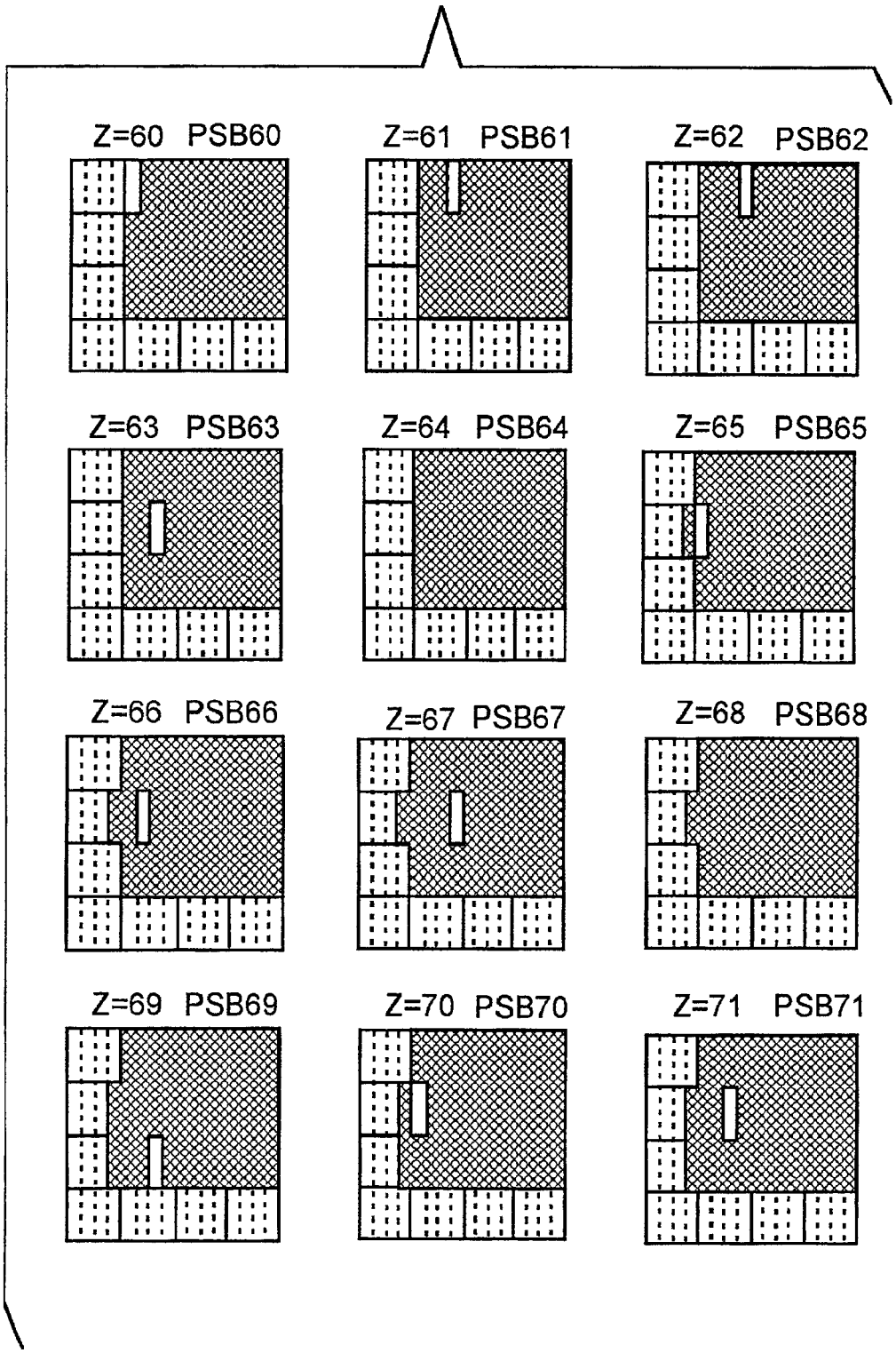
Figure 10G:
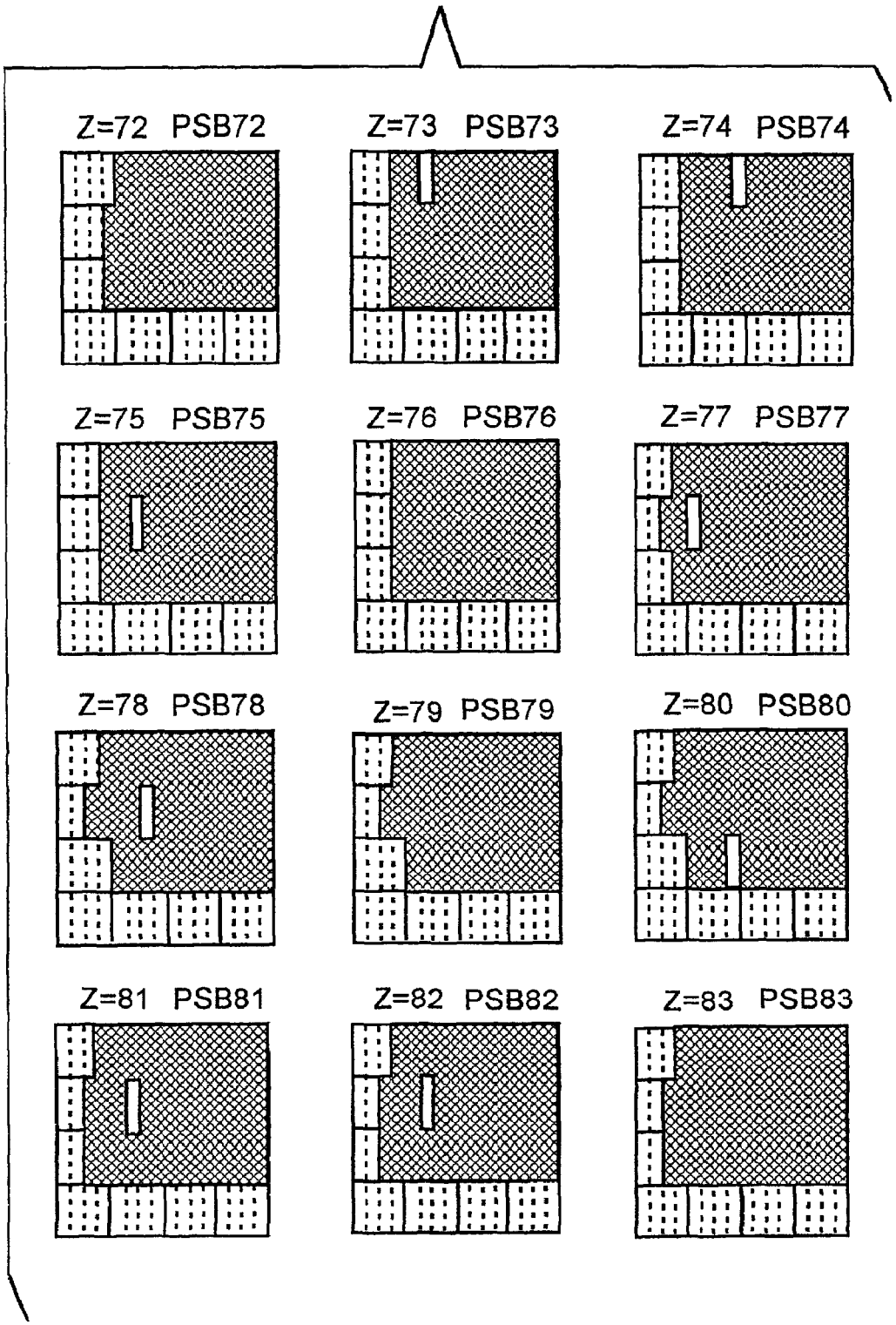
Figure 10H:
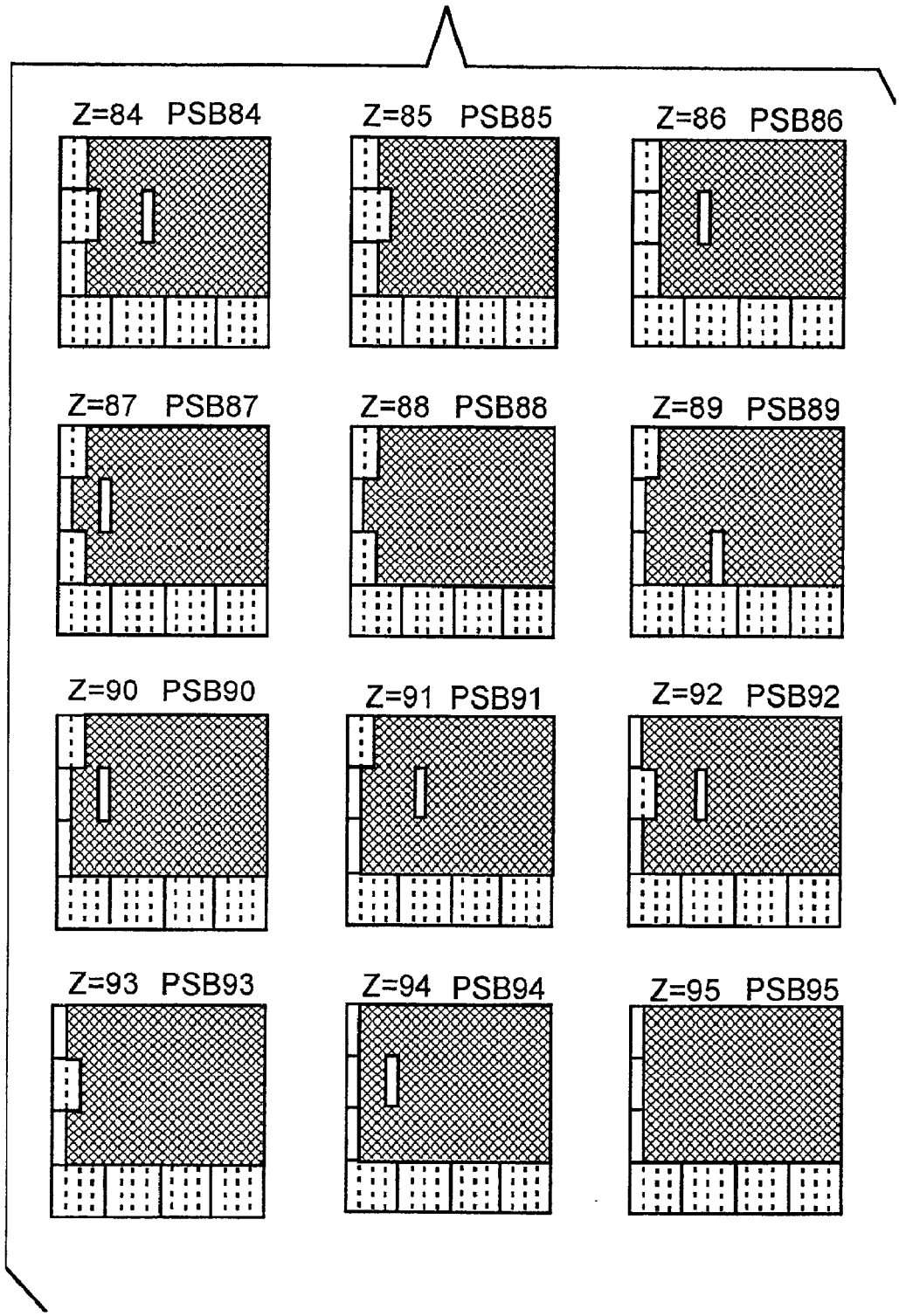
Figure 10I:
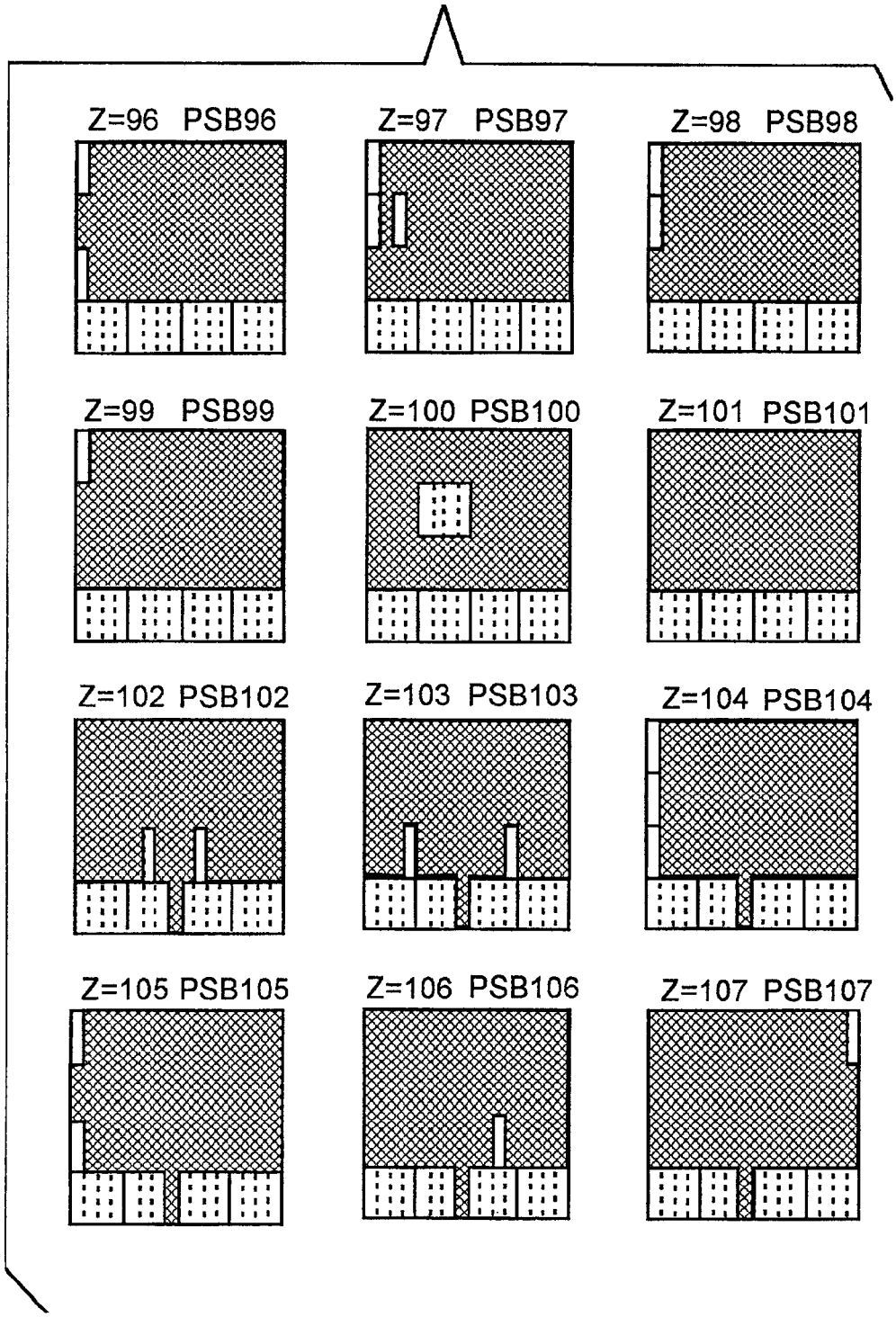
Figure 10J:
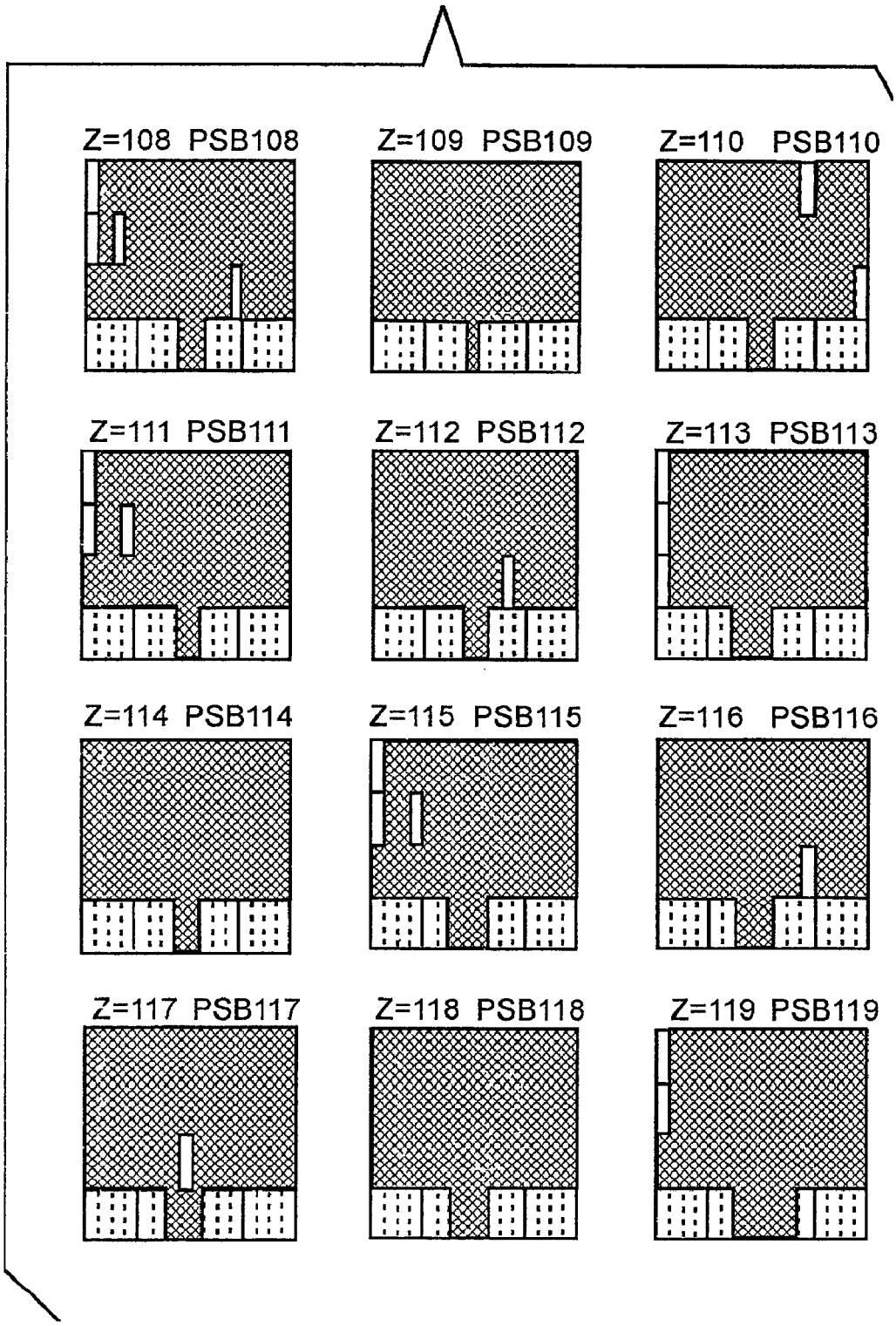
Figure 10K:
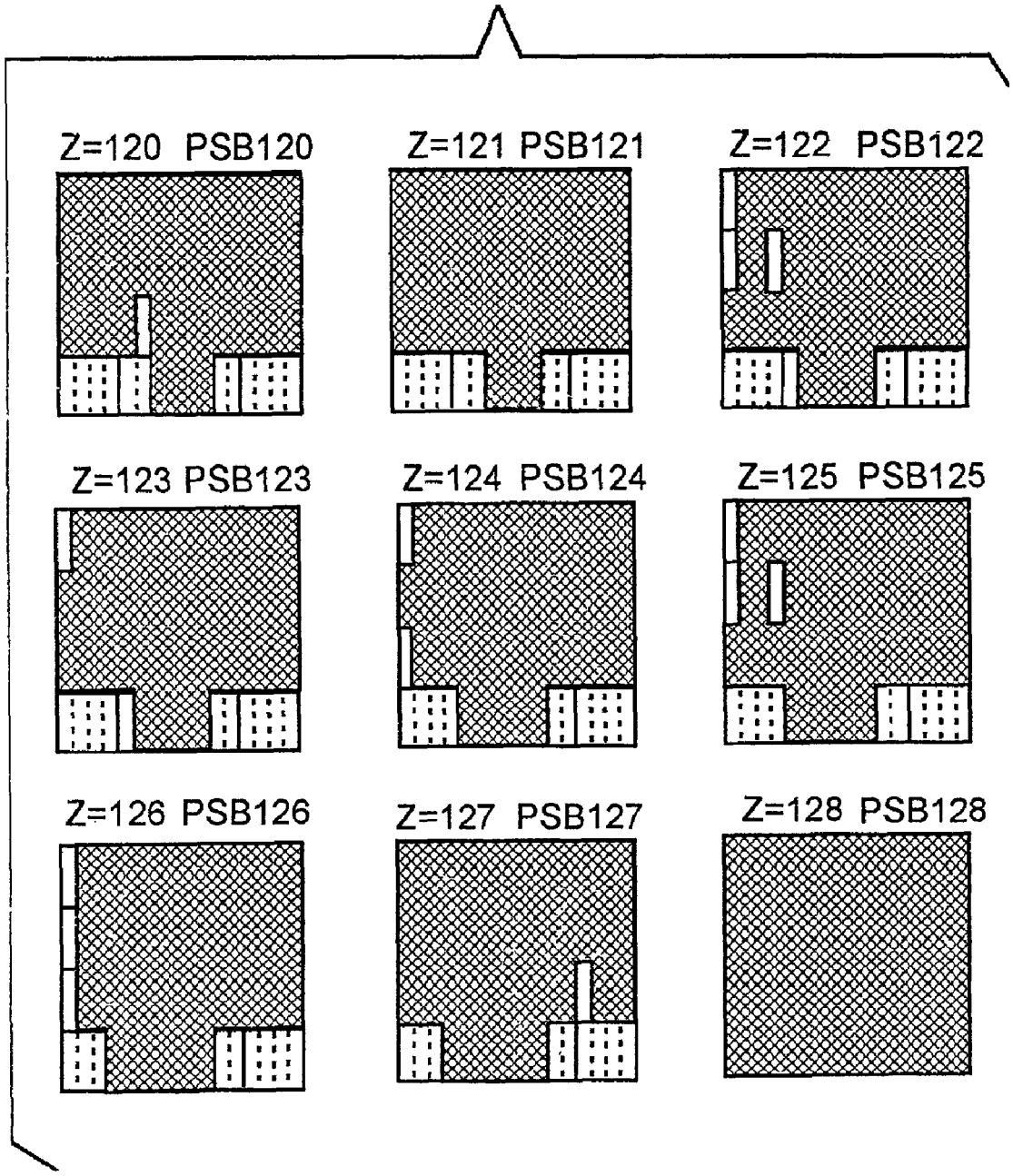

FIG. 6 shows PSA1-PSA4 as examples of exposure patterns. FIG. 7 shows the optical energy states corresponding to exposure patterns PSA1-PSA4 of FIG. 6. FIG. 8 shows the recording state on recording paper PP corresponding to exposure patterns PSA1-PSA4 of FIG. 6. FIG. 9 shows the optical energy distributions due to movement in the main scan direction by the laser beam. FIGS. 7 and 8 were derived by simulations. FIG. 8 shows the recording state with binarization using 5.2 erg as the threshold value.

Exposure patterns PSA1-PSA4 are 3*12 matrices wherein discrete elements DT of a square matrix of 3*3 elements are divided into four segments in the main scanning direction. In FIG. 6, EMW is indicated in white, and EMB is indicated in black.

EMB corresponds to the irradiation of the surface of photosensitive drum 12 by a laser beam emitted from semiconductor laser 21 when said semiconductor laser 21 is in the ON state. A single EMB corresponds to the irradiation, i.e., exposure, of the photosensitive drum per unit time. The total number of EMB is the total exposure time.

The discrete elements of the square matrix correspond to single picture elements of image data DG, and pulse width modulation of semiconductor laser 21 is accomplished to divide discrete elements into four segments. Laser beam LB may be, for example, a round shape having a diameter of about 60 μm with a static state half-intensity width in the main scan direction and sub-scanning direction, such that the energy level is greater in the center portion of said beam and diminishes gradually approaching the outer boundary of said beam. After laser beam LB scans a one-line segment in the main scan direction on the surface of photosensitive drum 12, the next line is scanned, such that adjacent cells EM in the main scan direction of the exposure pattern are scanned continuously, and adjacent cells EM in the sub-scanning direction are scanned non-continuously, i.e., discretely with spatial intervals.

As a result, when EMB cells are adjacent in the main scan direction, the optical energy of the laser beam is additively increased, such that the maximum optical energy increases, as shown in FIG. 9. Conversely, when EMB cells are adjacent in the sub-scanning direction, the participating optical energy is small, such that the maximum optical energy is not appreciably greater. That is, even when the number of EMB cells is identical, i.e., the total exposure time is identical. EMB cells are adjacent and continuous in the main scan direction and the maximum optical energy increases, whereas when the EMB cells are adjacent in the sub-scanning direction, the maximum optical energy is less. Accordingly, even though the total exposure time is identical, electrostatic latent images are formed on the surface of photosensitive drum 12 via different optical energies.

In electrophotographic recording, toner adheres only to areas that have received optical energy which surpasses a particular threshold value in accordance with the sensitivity of the photosensitive drum 12 and magnitude of the developing bias, thereby developing a latent image and forming a black image. Accordingly, when developing electrostatic latent images formed by mutually different optical energies, the areas of the formed images are different. That is, even though the number of individual EMB cells is identical, the areas of the image recorded on the recording paper PP can differ by changing the arrangement positions of the EMB cells. Using this principle, recording of mutually dissimilar tones can be realized due to mutually different EMB cell positions in relation to a plurality of exposure patterns having mutually identical number of EMB cells.

In FIG. 6, exposure pattern PSA1 has a total of four EMB cells, and the center element DT is recorded as black. In this instance, the optical energy produces nearly concentric circles, as shown in FIG. 7, and a circular black image FG1 in the center is recorded, as shown in FIG. 8.

In all the exposure patterns PSA2-PSA4 of FIG. 6, the total number of EMB cells is five, and 5/4 elements DT are recorded. The positions of the EMB cells in these patterns are mutually dissimilar. In exposure pattern PSA2, five EMB cells are arranged consecutively in the horizontal direction; in exposure pattern PSA3, a single EMB cell is arranged on the line above the other four EMB cells; in exposure pattern PSA4, two EMB cells are arranged on the line above the other three EMB cells. Thus, as shown in FIG. 7, the optical energy is greatest for exposure pattern PSA2 having five consecutive EMB cells in the horizontal direction, and the optical energy is least for exposure pattern PSA4 having the fewest number of consecutive cells. Therefore, as shown in FIG. 8 image FG2 corresponding to exposure pattern PSA2 is largest, and image FG4 corresponding to exposure pattern PSA4 is smallest. The dot area ratios (%) of images FG1-FG4 of exposure patterns PSA1-PSA4 were 2.6, 8.0, 5.0, and 1.3, respectively. As can be clearly understood from a comparison of images FG1 and FG4, the fewer the number of EMB cells the greater the area of the image recorded on recording paper PP via the position of EMB cells of the exposure pattern.

As previously described, it is possible to increase the number of tone levels by changing the positions of EMB cells while maintaining uniformity of the element dividing number and size of the matrix of the exposure patterns. That is, the number of tone levels can be increased without reducing resolution. Linearlized tonal characteristics can be obtained by combining the total number of EM cells and the position of discrete EM cells.

Returning now to FIG. 4, when image data DG are 8-bit data expressing 129 tone levels including all white and all black, 129 individual exposure patterns are stored in pattern ROM 31.

FIGS. 10A-10K show 129 discrete exposure patterns PSB0-PSB128 stored in pattern ROM 31. Exposure patterns PSB0-PSB128 are 4*16 matrices herein each element DT of a 4*4 dot square matrix is divided into four segments in the horizontal direction. In the drawing, EMW indicates a white cell, and EMB indicates a black cell.

The aforesaid exposure patterns PSB0-PSB128 express exposure patterns of tones from level "0" to level "128" among the 129 tone levels, and express the Z-addresses 0-128, respectively. These exposure patterns PSB0-PSB128 are selectable so as to obtain linear output characteristics relative to scanning optical unit 11 having the optical characteristics described below.

Resolution: 2400 DPI in main scan direction 600 DPI in sub-scanning direction Image clock: 8.9 MHz Laser intensity: 0.23 mW Static beam diameter (half-intensity): 60 μm in both main and sub-scan directions In Z-address counter 32, Z-address Z is generated which corresponds to the image data DG value, and which specifies one of the exposure patterns PSB. Cells EM of the specified exposure patterns PSB are sequentially read according to X-address X and Y-address Y specified by X-address counter 33 and Y-address counter 34 and generated as data DE, and the semiconductor laser 21 is switched ON/OFF in accordance with the value of said data DE. Z-address Z, X-address X, and Y-address Y may be combined as necessary, to accomplish pattern ROM 31 address specification via said combined addresses.

According to the construction of the present embodiment, the number of tone levels can be determined by the number of exposure patterns, and the tone levels can be set fractionally.

Furthermore, although the value of each EM cell is binary in the present embodiment as described above, it is to be noted that said values may be ternary or greater. Ternary or greater values allow an increased number of tone levels and improve image quality. Furthermore, the dividing number k may be decreased, and that fraction augmented by multilevel values to maintain the same number of tones, while reducing frequency of the picture element clock signal SC.

Figure 11:
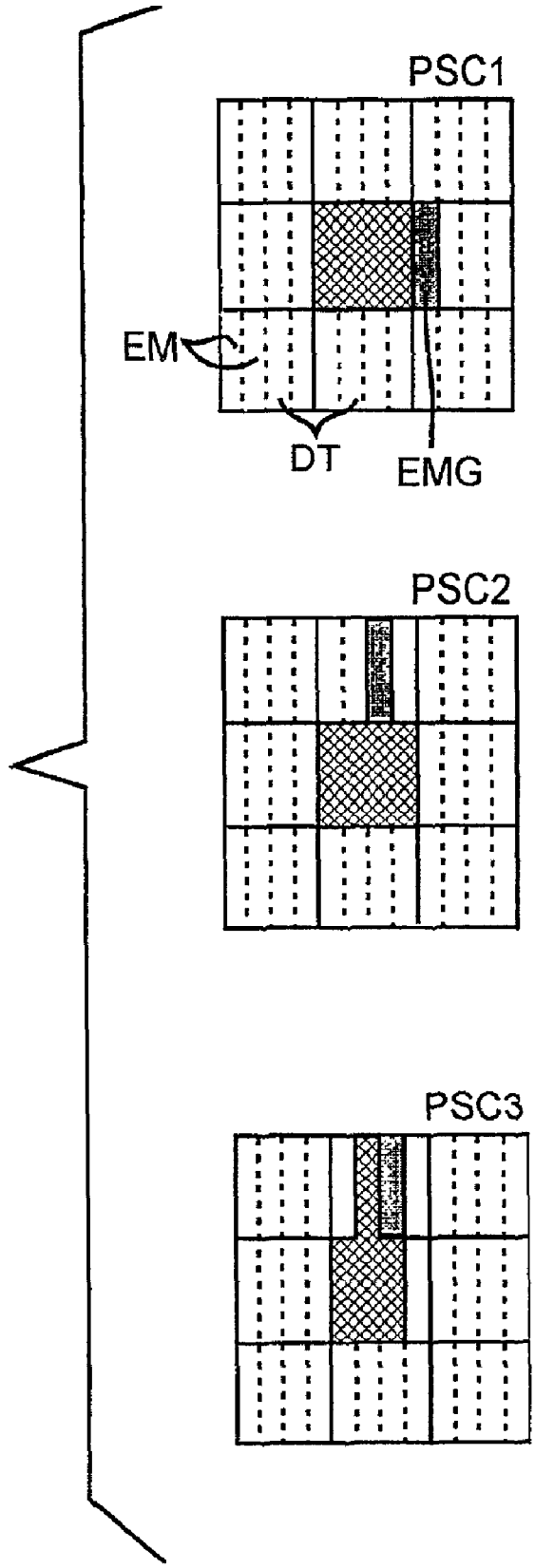
FIG. 11 shows exposure patterns PSC1-PSC3.
Figure 12:
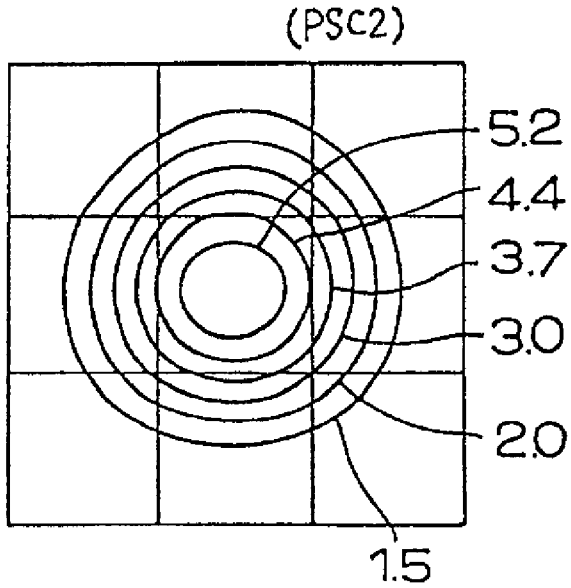
FIG. 12 shows the optical energy distribution corresponding to the exposure pattern PSC2 of FIG. 11.
Figure 13:
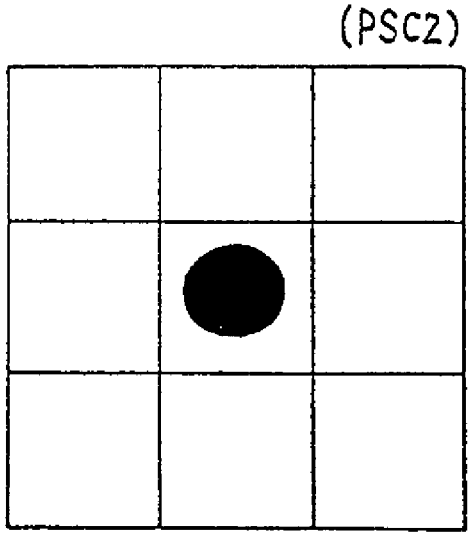
FIG. 13 shows the recording state on the recording paper corresponding to exposure pattern PSC2 of FIG. 11.

FIG. 11 shows ternary exposure patterns PSC1-PSC3. Exposure patterns PSC1-PSC3 are 3*12 matrices are divided into four segment of 3*3 square elements DT in the horizontal direction, and each cell EM is a value of either "0", "1", or "2". In the following description, cells with a value of "0" are designated EMW, cells with a value of "1" are designated EMG, and cells with a value of "2" are designated EMB. In FIG. 11, EMW cells are white, EMG cells are gray, and EMB cells are black. FIGS. 12 and 13 show optical energy states and recording states on recording paper PP corresponding to the exposure patterns PSC2.

Although semiconductor laser 21 is switched ON in correspondence with EMG and EMB, said laser is ON at the rated intensity for EMB and ON at one half the rated intensity for EMG.

Even when the total number of cells EMB and EMG are identical in the aforesaid exposure patterns PSC, the ratio of cells EMB to EMG, and there relative positional arrangements produce different areas of image FG recorded on recording paper PP. Accordingly, the number of tones may be increased to a number greater than the aforesaid exposure patterns PSA.

Although recorded at identical threshold values, the area of image FG in exposure pattern PSC1 is between the aforesaid exposure patterns PSA1 and PSA2, the area in exposure pattern PSC2 is smaller than that of PSC3, and the maximum optical energy in pattern PSC3 is below the threshold value such that the image cannot be recorded. The dot area ratio (%) of the images FG in exposure patterns PSC1-PSC3 are 5.1, 3.8, and 0.0, respectively.

Although a scanning optical system 11 having a semiconductor laser 21 is used in the previously described embodiment, it is to be understood that an optical system having an LED array, liquid crystal, PLZT or the like may be alternatively used.

A single elements DT of exposure patterns PS correspond on one-to-one basis with a single picture element of image data DG in the present embodiment, but is to be noted that a single exposure pattern PS may correspond to a single picture element of image data DG. Furthermore, a plurality of elements DT of exposure pattern PS may correspond to a single picture element of image data DG, and a single cell EM or a plurality of cells EM may correspond to a single picture element of image data DG.

Although the previously described embodiment has been described in terms of exposure patterns wherein the screen angle is at 0 and recording image is thickened from at single point, this method is obviously applicable to other types of exposure patterns. For example, when applied to fill color printers, use of exposure patterns which set different screen angles for each color may similarly be considered for normal printing.

The present embodiment is further applicable to recording or displaying by methods other than electrophotographic recording methods, such as thermal recording methods or ink jet recording methods.

The embodiment descried above provides a multi-tone recording method and apparatus that reconciles tonality and resolution at low cost. Furthermore, the present embodiment increases the freedom of tonal expression, while improving the linearity of tonal characteristics by reconciling tonality and resolution.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

[1. A multi-tone image processing method comprising:

receiving a plurality of image data wherein each image data represents a tone level;

specifying a pattern from a plurality of patterns stored in a memory in response to each of said image data, each of said plurality of patterns defining a number of recording operations and positions of recording operations within a specific range;

wherein each pattern represents a specific tone level and wherein different tone levels may include a same number of recording operations at different positions within the specific range; and generating recording data for executing recording operations by reviewing the pattern specified for each image data.]

[2. A multi-tone image processing method as claimed in claim 1, wherein all of the recording operations are of substantially the same intensity.]

[3. A multi-tone image processing method as claimed in claim 1, wherein more than one tone level includes the same number of recording operations at different positions.]

[4. A multi-tone image processing apparatus for receiving multi-tone image data representing a tone level of a multi-tone image and generating recording data based on the multi-tone image data, comprising:

a memory which stores a plurality of patterns corresponding to a plurality of tone levels, respectively, each of said plurality of patterns defining a number of recording operations and positions of recording operations within a specific range, at least two of said plurality of patterns being identical in the number of recording operations but different in the positions of recording operations within said specific range for different tone levels; and a control unit which specifies one of said plurality of patterns stored in said memory in response to the multi-tone image data and generates recording data by reviewing the specified pattern.]

[5. A multi-tone image processing apparatus as claimed in claim 4, wherein each of said plurality of patterns is constituted by a matrix in which each element of an m*m square matrix is divided into k segments in a row direction.]

[6. A multi-tone image processing apparatus as claimed in claim 4, wherein all of the recording operations are of substantially the same intensity.]

[7. A multi-tone image processing apparatus as claimed in claim 4, wherein each of said plurality of patterns is constituted by an m*n matrix.]

[8. A multi-tone image processing apparatus as claimed in claim 7, wherein the value of each cell of the m*n matrix is binary.]

[9. A multi-tone image processing apparatus as claimed in claim 7, wherein the value of each cell of the m*n matrix is ternary or greater.]

[10. A multi-tone image recording apparatus for recording a multi-tone image based on multi-tone image data representing a tone level of a multi-tone image, comprising:

converting means for converting multi-tone image data into recording data so that at least two tone levels are realized by differentiating positions of recording dots within a specific range while a number of the recording dots remains constant within said specific range; and a recording system which receives the recording data and produces the recording dots based on the recording data.]

[11. A multi-tone image recording apparatus as claimed in claim 10, wherein said converting means includes a memory which stores a plurality of patterns corresponding to a plurality of tone levels, respectively, each of said plurality of patterns defining the number of the recording dots and the positions of the recording dots within said specific range.]

[12. A multi-tone image recording apparatus as claimed in claim 10, wherein said recording system includes a photosensitive member, an optical system which irradiates the photosensitive member by a light spot, and a developing device which develops areas irradiated by the light spot with developer.]

[13. A multi-tone image processing method as claimed in claim 10, wherein all of the recording dots are of substantially the same intensity.]

[14. A multi-tone image recording apparatus as claimed in claim 11, wherein each of said plurality of patterns is constituted by an m*n matrix of which each cell corresponds to the recording dot.]

[15. A multi-tone image recording apparatus as claimed in claim 14, wherein the adjacent recording dots in a row direction of the matrix are produced continuously while the adjacent recording dots in a column direction of the matrix are produced discretely with a spatial interval.]

[16. A multi-tone image recording apparatus as claimed in claim 15, wherein the recording dots are produced by pulse width modulation in the row direction of the matrix.]

17. A multi-tone image recording apparatus comprising:

a photosensitive member which moves in a sub-scanning direction;

a laser optical system which selectively generates a laser beam and scans said photosensitive member with a spot of the laser beam in a main scanning direction substantially perpendicular to said sub-scanning direction;

a developing device which develops areas irradiated by the spot of the laser beam with developer;

a memory which stores a plurality of exposure patterns corresponding to a plurality of tone levels, respectively, each of said plurality of exposure patterns defining a number of irradiation by the spot of the laser beam and the positions of the irradiation within a specific range, at least two of said plurality of exposure patterns being identical in the number of the irradiation but different in the positions of the irradiation within said specific range for realizing different tone levels, *wherein a size of the area developed by the developing device within said specific range is different for each tone level*;

a controller which receives multi-tone image data representing a tone level of a multi-tone image and specifies one of said plurality of exposure patterns in response to the multi-tone image data; and a driver which drives said laser optical system to control generation of the laser beam by reviewing the exposure pattern specified by said controller.

18. A multi-tone image recording apparatus as claimed in claim 17, wherein each of said plurality of exposure patterns is constituted by an m*n matrix of which each cell corresponds to the irradiation by the spot of the laser beam.

19. A multi-tone image recording apparatus as claimed in claim 17, wherein generation of the laser beam is controlled by pulse width modulation in the main scanning direction.

20. A multi-tone image processing method as claimed in claim 17, wherein all of the irradiations are of substantially the same intensity.

21. A multi-tone image recording apparatus as claimed in claim 17, wherein said laser optical system includes a semiconductor laser.

22. A multi-tone image recording apparatus as claimed in claim 21, wherein said driver switches on and off the semiconductor laser in correspondence with the exposure pattern specified by said controller.

23. A multi-level image recording apparatus as claimed in claim 22, wherein said driver controls the intensity of the laser beam between three or more levels.

24. A multi-tone image processing method comprising:

receiving a plurality of image data wherein each image data represents a tone level;

specifying a pattern from a plurality of patterns, each of said plurality of patterns defining a number of recording operations and positions of recording operations within a specific range, wherein each pattern represents a specific tone level and at least one of the patterns has a larger number of recording operations than another of the patterns that represents a [lighter] *darker* tone level within the specific range; and generating recording data for executing recording operations by reviewing the pattern specified for each image data.

[25. A multi-tone image processing method, comprising:

receiving a plurality of image-data, wherein each image data represents a tone level;

specifying a pattern of black and white picture elements from a plurality of patterns, each of said plurality of patterns defining a number of recording operations all of which have substantially the same intensity and positions of the recording operations within a specific range, wherein each of said patterns represents a specific tone level and wherein at least one of the patterns includes a white picture element in a position that includes a black picture element in another of the patterns representing a lighter tone level; and generating recording data for executing recording operations by reviewing the pattern specified for each image data.]

[26. A multi-tone image processing method, comprising:

receiving a plurality of image-data, wherein each image data represents a tone level;

specifying a pattern of black and white picture elements from a plurality of patterns, each of said plurality of patterns defining a number of recording operations and positions of recording operations within a specific range, wherein each of said patterns represents a specific tone level and wherein at least one of the patterns includes a white picture element in a position that includes a black picture element in another of the patterns representing a lighter tone level, wherein the another pattern and the at least one pattern have the same number of recording operations; and generating recording data for executing recording operations by reviewing the pattern specified for each image data.]

[27. A multi-tone image processing method as claimed in claim 26, wherein all of the recording operations are of substantially the same intensity.]

[28. A multi-tone image processing method comprising:

receiving a plurality of image data wherein each image data represents a tone level;

specifying a pattern of black and white picture elements from a plurality of patterns, each of said plurality of patterns defining a number of recording operations and positions of the recording operations within a specific range, wherein each of said patterns represents a specific tone level and wherein at least one of the patterns includes a white picture element in a position that includes a black picture element in another of the patterns representing a lighter tone level; and generating recording data for executing recording operations by reviewing the pattern specified for each image data, wherein said recording operations are executed by a photo emitter which emits a beam having a characteristic in which an energy level is greater in a center portion of said beam than in a remaining portion of said beam.]

*29. A multi-tone image processing apparatus for converting multi-tone image data representing a tone level of a multi-tone image to binary image data, said apparatus comprising:*

*a memory which stores a plurality of patterns representing a plurality of tone levels, respectively, each of said plurality of patterns having effective cells and non-effective cells and defining a number of effective cells and positions of effective cells within a specific range, wherein at least one of the patterns has a larger number of effective cells than another of the patterns that represents a darker tone level within the specific range; and*

*a converter which specifies one of said plurality of patterns stored in said memory according to the tone level of the multi-tone image data to be converted and*

*converts the multi-tone image data to the binary image data based on the specified pattern.*

*30. A multi-tone image processing apparatus as claimed in claim 29, wherein each of said plurality of patterns is constituted by a matrix in which each element of an m*m square matrix is divided into k cells in a row directions.*

*31. A multi-tone image recording apparatus comprising:*

*a memory which stores a plurality of patterns representing a plurality of tone levels, respectively, each of said plurality of patterns having effective cells and non-effective cells and defining a number of effective cells and positions of effective cells within a specific range, wherein at least one of the patterns has a larger number of effective cells than another of the patterns that represents a darker tone level within the specific range;*

*a converter which specifies one of said plurality of patterns stored in said memory according to the tone level of the multi-tone image data to be converted and converts the multi-tone image data to the binary image data based on the specified pattern; and*

*a printer which prints the image according to the binary image data converted by said converter.*

*32. A multi-tone image recording apparatus as claimed in claim 31, wherein said converter includes an X-address counter, a Y-address counter and a Z-address counter, said Z-address counter specifying one of said patterns in the memory, and the X-address counter and the Y-address counter specifying one of said cells of the specified pattern according to horizontal and vertical printing operations of said printer.*

*33. A multi-tone image recording apparatus as claimed in claim 31, wherein said printer includes a light source which emits a light beam, a driver which drives said light source based on the binary image data, an image carrier which moves in a vertical direction, and a deflector which deflects said light beam in a horizontal direction and scans said image carrier to form an image on said image carrier.*

*34. A multi-tone image recording apparatus as claimed in claim 33, wherein said converter includes an X-address counter, a Y-address counter and a Z-address counter, said Z-address counter specifying one of said patterns in the memory, and the X-address counter and the Y-address counter specifying one of said cells of the specified pattern according to horizontal and vertical scanning operations of said printer.*

*35. A multi-tone image recording apparatus for recording an image based on multi-tone image data representing tone levels on an image, said recording apparatus comprising:*

*a converter which converts multi-tone image data into recording data so that at least two tone levels are realized by differentiating positions of recording dots within a specific range while a lighter tone level has a larger number of recording dots than a darker tone level within the specific range; and*

*a printer which receives the recording data from said converter and records the recording dots based on the recording data.*

*36. A multi-tone image recording apparatus as claimed in claim 35, wherein said printer includes a light source which emits a light beam, a driver which drives said light source based on the recording data, an image carrier which moves in a vertical direction, and a deflector which deflects said light beam in a horizontal direction and scans said image carrier to form an image on said image carrier.*

*37. A multi-tone image recording apparatus as claimed in claim 17, wherein said size of the area developed by the developing device within said specific range varies depending upon the number of adjacent irradiations continuing in the main scanning direction within said specific range.*

*38. A multi-tone image recording apparatus as claimed in claim 17, wherein said size of the are a developed by the developing device within said specific range varies depending upon the number of adjacent irradiations continuing in the main scanning direction or the sub-scanning direction within said specific range.*

* * * * *